United States Patent
Cho et al.

(10) Patent No.: US 11,829,459 B2
(45) Date of Patent: Nov. 28, 2023

(54) APPARATUS AND METHOD FOR AUTHENTICATING USER BASED ON MULTIPLE BIOMETRIC INFORMATION

(71) Applicant: ELECTRONICS AND TELECOMMUNICATIONS RESEARCH INSTITUTE, Daejeon (KR)

(72) Inventors: Kwan-Tae Cho, Daejeon (KR); Seok-Hyun Kim, Daejeon (KR); Soo-Hyung Kim, Daejeon (KR); Seung-Hyun Kim, Daejeon (KR); Young-Sam Kim, Daejeon (KR); Jong-Hyouk Noh, Daejeon (KR); Sang-Rae Cho, Daejeon (KR); Young-Seob Cho, Daejeon (KR); Jin-Man Cho, Daejeon (KR); Jung-Yeon Hwang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 626 days.

(21) Appl. No.: 17/065,897

(22) Filed: Oct. 8, 2020

(65) Prior Publication Data
US 2021/0141882 A1   May 13, 2021

(30) Foreign Application Priority Data
Nov. 12, 2019   (KR) .......................... 10-2019-0144124

(51) Int. Cl.
*H04L 29/06*   (2006.01)
*G06F 21/32*   (2013.01)
(Continued)

(52) U.S. Cl.
CPC .............. *G06F 21/32* (2013.01); *G06F 18/22* (2023.01); *G06N 3/02* (2013.01); *G06N 7/01* (2023.01); *G06V 40/50* (2022.01); *G06V 40/70* (2022.01)

(58) Field of Classification Search
CPC ......... G06F 21/32; G06F 18/22; G06V 40/50; G06N 7/01; G06N 3/02
See application file for complete search history.

(56) References Cited

U.S. PATENT DOCUMENTS

| 8,234,698 B2 | 7/2012 | Lee et al. |
| 8,290,972 B1 * | 10/2012 | Deshmukh ........ G06F 16/24556 |
| | | 707/758 |

(Continued)

FOREIGN PATENT DOCUMENTS

| CN | 105718848 A | * | 6/2016 | |
| CN | 105760859 A | * | 7/2016 | ......... G06K 9/00288 |

(Continued)

*Primary Examiner* — Shawnchoy Rahman

(57) ABSTRACT

Disclosed herein are an apparatus and method for user authentication based on multiple pieces of biometric information. The apparatus may include one or more processors and executable memory for storing at least one program executed by the one or more processors. The at least one program receives multiple pieces of biometric information from the client device of a user, generates the personal identifier of the user using a neural network and a Bloom filter algorithm, and checks the similarity between the personal identifier of the user and each of personal identifiers previously registered in a database, thereby authenticating the user.

14 Claims, 8 Drawing Sheets

(51) Int. Cl.
*G06N 3/02* (2006.01)
*G06V 40/50* (2022.01)
*G06V 40/70* (2022.01)
*G06F 18/22* (2023.01)
*G06N 7/01* (2023.01)

(56) References Cited

U.S. PATENT DOCUMENTS

| | | |
|---|---|---|
| 10,339,362 B2 | 7/2019 | Othman et al. |
| 10,515,009 B1 * | 12/2019 | Wallace .............. G06F 12/0253 |
| 10,621,379 B1 * | 4/2020 | Kim .................... G06F 21/6254 |
| 2006/0245619 A1 * | 11/2006 | Sathath .................. G06F 21/31 |
| | | 902/3 |
| 2007/0071286 A1 * | 3/2007 | Lee ........................ G06V 40/70 |
| | | 382/115 |
| 2012/0144470 A1 | 6/2012 | Kim et al. |
| 2018/0307950 A1 * | 10/2018 | Nealis ................... G06F 9/3893 |
| 2018/0365401 A1 | 12/2018 | Lee et al. |
| 2020/0380360 A1 * | 12/2020 | Yu ............................ G06N 3/08 |

FOREIGN PATENT DOCUMENTS

| | | | | |
|---|---|---|---|---|
| CN | 111684536 A | * | 9/2020 | ............. A61B 5/022 |
| KR | 1020120125802 A | | 11/2012 | |
| KR | 101742523 B1 | | 6/2017 | |
| KR | 1020180137771 A | | 12/2018 | |

\* cited by examiner

| USER | SUB-IDENTIFIER 1($BF_1$) | SUB-IDENTIFIER 2($BF_2$) | SUB-IDENTIFIER 3($BF_3$) | ... ... | SUB-IDENTIFIER L($BF_L$) | ... ... |
|---|---|---|---|---|---|---|
| A | 0110 1011 1000 0110 | 1011 0011 0001 1001 | 1000 0001 1011 1011 | ... ... | 0101 1001 1100 0011 | ... ... |
| B | 1001 0010 0010 1111 | 0111 1001 1110 0000 | 1101 0100 0011 1001 | ... ... | 1101 0001 0100 1011 | ... ... |
| C | 0110 1111 0000 0101 | 1111 0000 0001 0111 | 0101 0110 1100 1100 | ... ... | 1001 1001 0110 1010 | ... ... |
| ... ... | ... ... | ... ... | ... ... | ... ... | ... ... | ... ... |

FIG. 4

APPARATUS AND METHOD FOR AUTHENTICATING USER BASED ON MULTIPLE BIOMETRIC INFORMATION

CROSS REFERENCE TO RELATED APPLICATION

This application claims the benefit of Korean Patent Application No. 10-2019-0144124, filed Nov. 12, 2019, which is hereby incorporated by reference in its entirety into this application.

BACKGROUND OF THE INVENTION

1. Technical Field

The present invention relates generally to user authentication technology, and more particularly to user authentication technology using multiple pieces of biometric information.

2. Description of the Related Art

An ID/password-based authentication method that is used when an online service system is accessed has the risk of exposure of an ID/password by a hacking program, such as a keylogger or the like. Also, when an administrator manages multiple servers, it is not easy to periodically change the IDs/passwords of the servers and manage the same. That is, it is highly probable that a security incident arises from the exposure of the password of an administrator's account when the account is used in common for development, management, or maintenance of the server. As an authentication method for solving the security problem with the ID/password-based method, user identification technology (including user authentication technology) based on biometric information, which uses the unique characteristics of a user's body in order to check the identity of a user, is receiving a lot of attention. However, in services requiring a high security level based on currently available technology, authenticating a user using only a single piece of biometric information is not sufficient, and it is desirable to authenticate a user using two or more pieces of biometric information.

Technology configured to perform user authentication using two or more pieces of biometric information contributes to raising the accuracy of user authentication, but the increasing number of pieces of biometric information to be authenticated may cause an increase in the amount of system resources required for authentication. Also, in the case of an existing user identification system based on multiple pieces of biometric information, the size of storage space required for storing biometric information and the computational load of checking the similarity between pieces of biometric information increase in proportion to the number of pieces of biometric information.

In other words, when service is provided for a large number of users, the number of pieces of biometric information increases, and the size of required storage space and the time taken to provide the service also increase. This leads to an increase in maintenance costs borne by a service provider in order to manage the biometric information of users, and makes it difficult to smoothly provide service to service users. Further, when a user information database is leaked outside due to negligent management of a server, hacking, or the like, serious loss to individuals, companies, and governments may result.

Meanwhile, Korean Patent Application Publication No. 10-2012-0125802, titled "Incremental user authentication system and method using multi-biodata", discloses an incremental user authentication system and method using multiple pieces of biometric information configured to integrate facial image information and voice feature information of the user to be authenticated, to extract the features of audio/visual information as the eigenvector of a low dimension and a unique value, to incrementally train only newly input data, and to thereby authenticate the user.

SUMMARY OF THE INVENTION

An object of the present invention is to enable rapid identification and authentication despite increasing the number of types of biometric information.

Another object of the present invention is to prevent an increase in the amount of storage space that is required even though the number of types of biometric information and the number of pieces of biometric information are increased.

A further object of the present invention is to prevent biometric information, which is private information, from being exposed when an identifier is exposed due to the leakage of a user database.

In order to accomplish the above objects, an apparatus for user authentication based on multiple pieces of biometric information according to an embodiment of the present invention may include one or more processors and executable memory for storing at least one program executed by the one or more processors. The at least one program may be configured to receive multiple pieces of biometric information from the client device of a user and generate the personal identifier of the user using a neural network and a Bloom filter algorithm and to authenticate the user by checking the similarity between the personal identifier of the user and each of personal identifiers previously registered in a database through comparison.

Here, the at least one program may generate multiple quantized values from the multiple pieces of biometric information using the neural network.

Here, the at least one program may generate multiple Bloom filter output values from the multiple quantized values using the Bloom filter algorithm.

Here, the multiple Bloom filter output values may respectively correspond to multiple sub-identifiers, and the at least one program may generate the personal identifier of the user by sequentially concatenating the multiple sub-identifiers from the first sub-identifier to the last sub-identifier.

Here, the at least one program may check the similarity between each of the multiple sub-identifiers of the personal identifier of the user and a corresponding one of multiple sub-identifiers of the personal identifier previously registered in the database through comparison, thereby authenticating the user.

Here, the at least one program may successively check similarities by comparing the first to last sub-identifiers of the personal identifier of the user with those of the previously registered personal identifier, thereby authenticating the user.

Here, the at least one program checks the similarity between second sub-identifiers following the first sub-identifiers only when the distance acquired by comparing the first sub-identifier of the personal identifier of the user with that of the previously registered personal identifier is equal to or less than a preset tolerance.

Here, the at least one program may determine that authentication of the user succeeds when each of the distances respectively acquired by comparing all of the sub-identifiers of the personal identifier of the user with corresponding ones of the sub-identifiers of the previously registered personal identifier is equal to or less than a preset first threshold and when the sum of the distances is equal to or less than a preset second threshold.

Also, in order to accomplish the above objects, a method for user authentication based on multiple pieces of biometric information, performed by an apparatus for user authentication based on multiple pieces of biometric information, according to an embodiment of the present invention may include receiving multiple pieces of biometric information from the client device of a user and generating the personal identifier of the user using a neural network and a Bloom filter algorithm; and authenticating the user by checking the similarity between the personal identifier of the user and each of personal identifiers previously registered in a database through comparison.

Here, generating the personal identifier of the user may be configured to generate multiple quantized values from the multiple pieces of biometric information using the neural network.

Here, generating the personal identifier of the user may be configured to generate multiple Bloom filter output values from the multiple quantized values using the Bloom filter algorithm.

Here, the multiple Bloom filter output values may respectively correspond to multiple sub-identifiers, and generating the personal identifier of the user may be configured to sequentially concatenate the multiple sub-identifiers from the first sub-identifier to the last sub-identifier, thereby generating the personal identifier of the user.

Here, authenticating the user may be configured to check the similarity between each of the multiple sub-identifiers of the personal identifier of the user and a corresponding one of multiple sub-identifiers of the personal identifier previously registered in the database through comparison, thereby authenticating the user.

Here, authenticating the user may be configured to successively check similarities by comparing the first to last sub-identifiers of the personal identifier of the user with those of the previously registered personal identifier, thereby authenticating the user.

Here, authenticating the user may be configured to check the similarity between second sub-identifiers following the first sub-identifiers only when the distance acquired by comparing the first sub-identifier of the personal identifier of the user with that of the previously registered personal identifier is equal to or less than a preset tolerance.

Here, authenticating the user may be configured to determine that authentication of the user succeeds when each of the distances respectively acquired by comparing all of the sub-identifiers of the personal identifier of the user with corresponding ones of the sub-identifiers of the previously registered personal identifier is equal to or less than a preset first threshold and when the sum of the distances is equal to or less than a preset second threshold.

BRIEF DESCRIPTION OF THE DRAWINGS

The above and other objects, features and advantages of the present invention will be more clearly understood from the following detailed description, taken in conjunction with the accompanying drawings, in which:

FIG. 4 is a view illustrating a user information database table according to an embodiment of the present invention;

DESCRIPTION OF THE PREFERRED EMBODIMENTS

Figure 1:
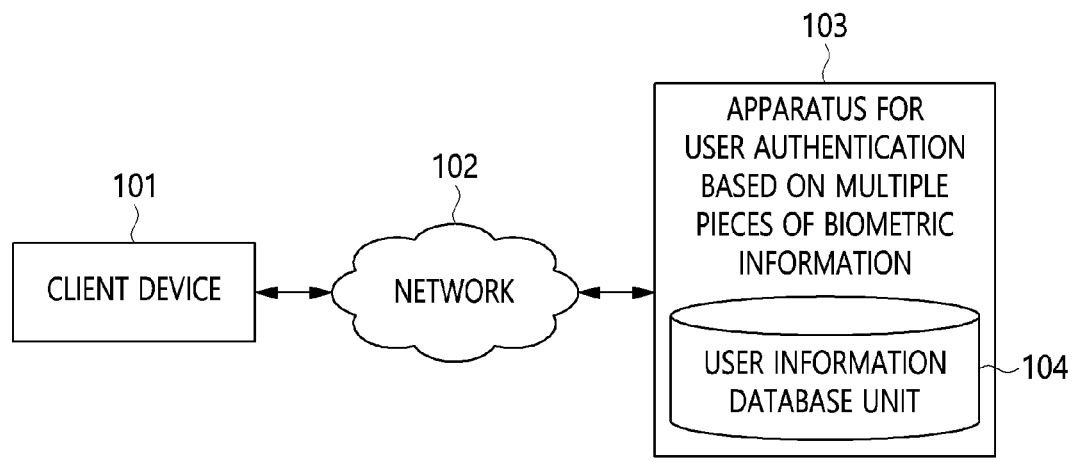
FIG. 1 is a block diagram illustrating an apparatus for user authentication based on multiple pieces of biometric information according to an embodiment of the present invention.

The present invention will be described in detail below with reference to the accompanying drawings. Repeated descriptions and descriptions of known functions and configurations that have been deemed to unnecessarily obscure the gist of the present invention will be omitted below. The embodiments of the present invention are intended to fully describe the present invention to a person having ordinary knowledge in the art to which the present invention pertains. Accordingly, the shapes, sizes, etc. of components in the drawings may be exaggerated in order to make the description clearer.

Throughout this specification, the terms "comprises" and/or "comprising" and "includes" and/or "including" specify the presence of stated elements but do not preclude the presence or addition of one or more other elements unless otherwise specified. Also, the term "unit", "member", "module", or the like may be understood as a unit for processing at least one function or operation, and such a unit may be implemented as hardware, software, or a combination thereof.

Generally, "identification" is checking identity to simply prove who the user is before authentication is performed. Also, "authentication" is verifying the validity of the identity of a transaction party, and may be generally performed after identification. In the present invention, "authentication" is understood as including "identification". The present invention may perform both identification and authentication functions by adjusting the number of identifiers to be verified.

The present invention intends to propose technical methods for generating an identifier and performing authentication using the identifier in order to efficiently authenticate users based on a database including a large amount of user information when there is a user authentication system in which a user is authenticated using multiple pieces of biometric information. In the present invention, a user authentication system based on deep learning is illustrated in order to help understanding, and the present invention may be applied to all systems capable of generating an integer sequence in order to identify users.

Hereinafter, a preferred embodiment of the present invention will be described in detail with reference to the accompanying drawings.

FIG. 1 is a block diagram illustrating a system for user authentication based on multiple pieces of biometric information according to an embodiment of the present invention.

Referring to FIG. 1, the system for user authentication based on multiple pieces of biometric information according to an embodiment of the present invention includes a client device 101, which is a user device equipped with a sensor capable of measuring multiple types of biometric information, and an apparatus 103 for user authentication based on multiple pieces of biometric information, which is capable of operating in conjunction with the client device through a network 102, such as a local network, the Internet, or the like.

The client device 101 may generate a personal identifier from biometric information and register the same in the user information database 104 of the apparatus 103 for user authentication based on multiple pieces of biometric information.

The apparatus 103 for user authentication based on multiple pieces of biometric information may perform user authentication by comparing the personal identifier, which is newly registered by the client device 101, with a previously registered personal identifier list.

Figure 2:
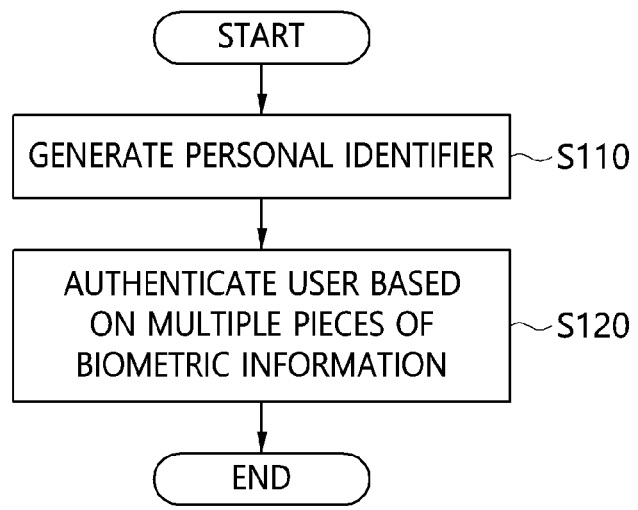
FIG. 2 is a flowchart illustrating a method for user authentication based on multiple pieces of biometric information according to an embodiment of the present invention.
Figure 3:
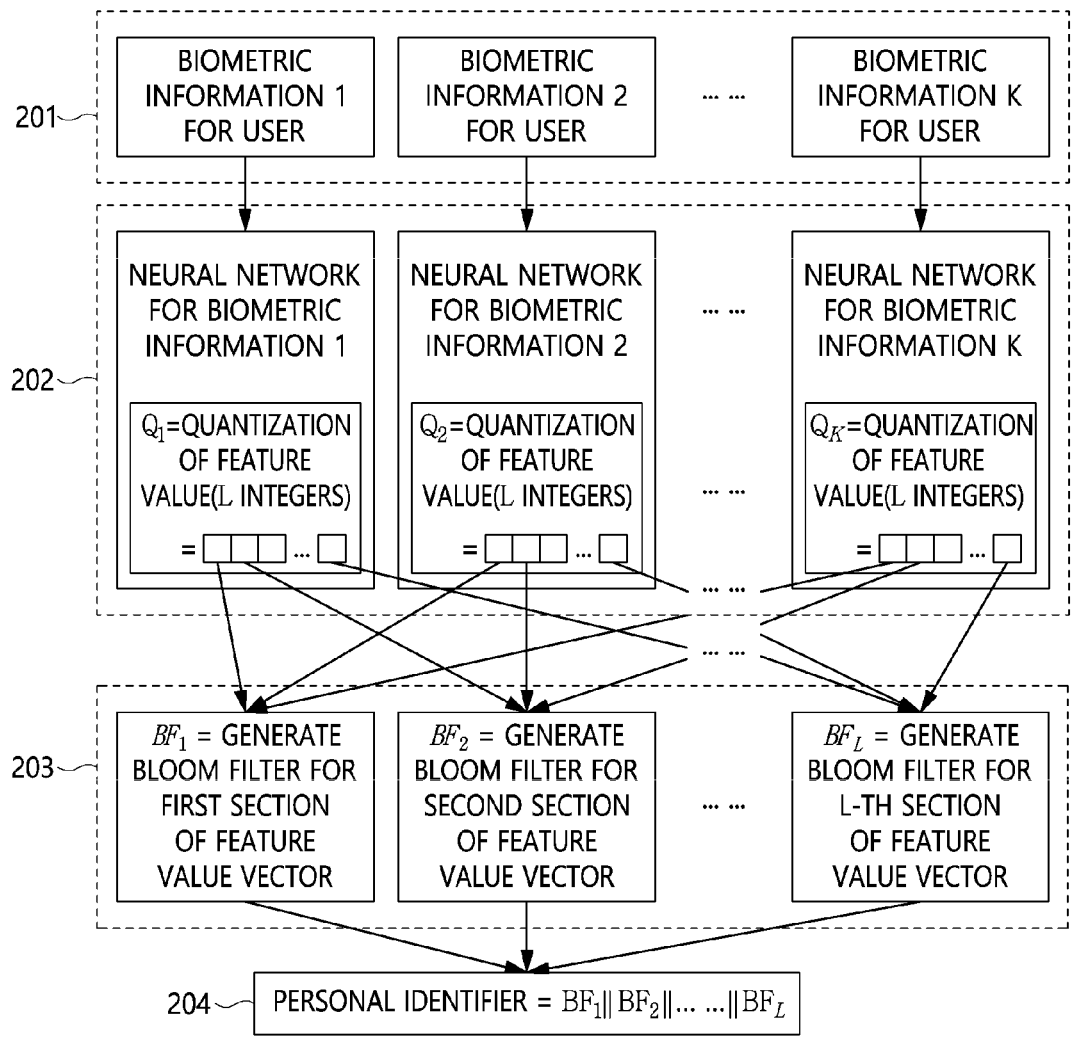
FIG. 3 is a view illustrating the process of generating a personal identifier according to an embodiment of the present invention.
Figure 5:
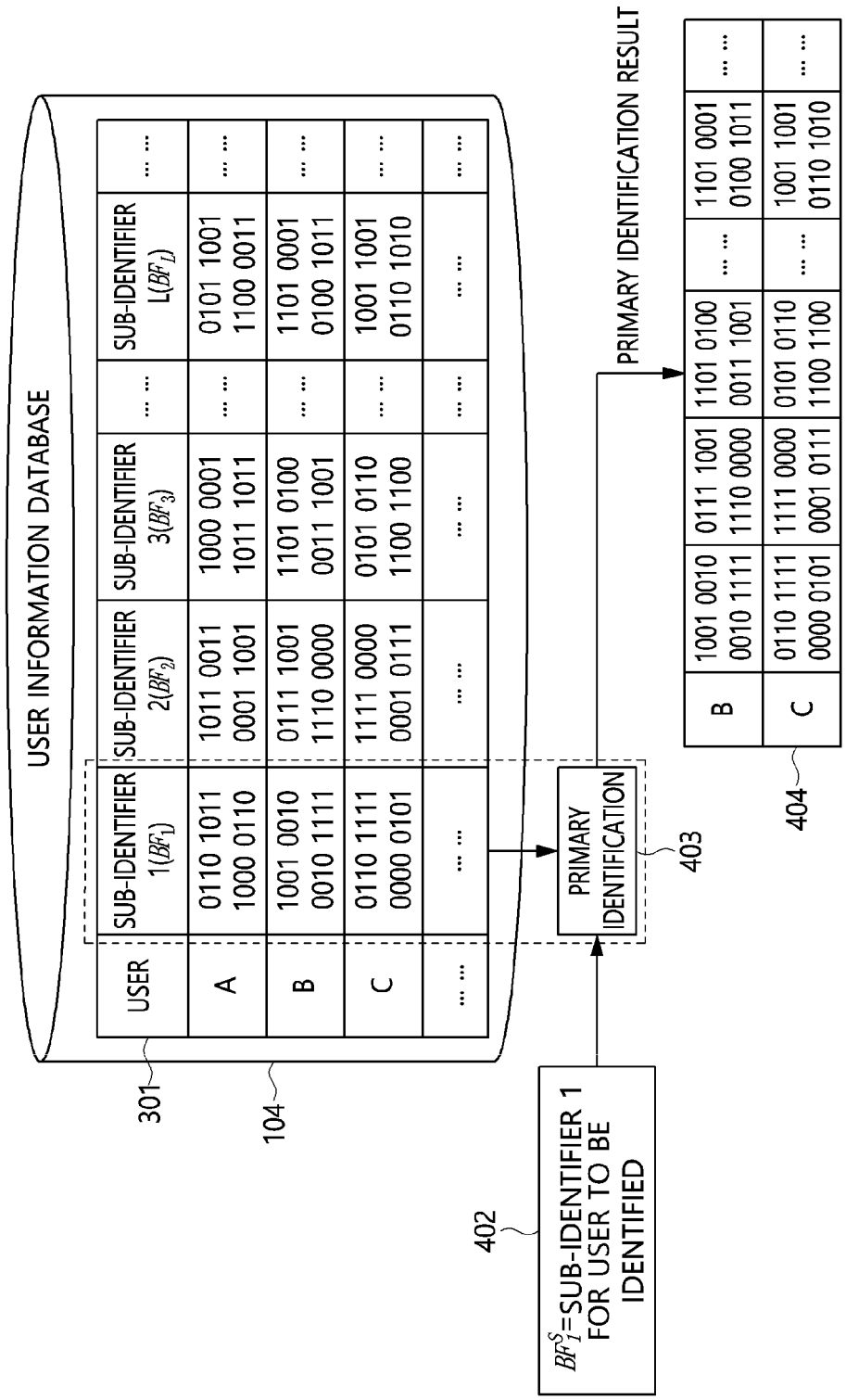
FIGS. 5 and 6 are views illustrating a user authentication procedure according to an embodiment of the present invention.
Figure 6:
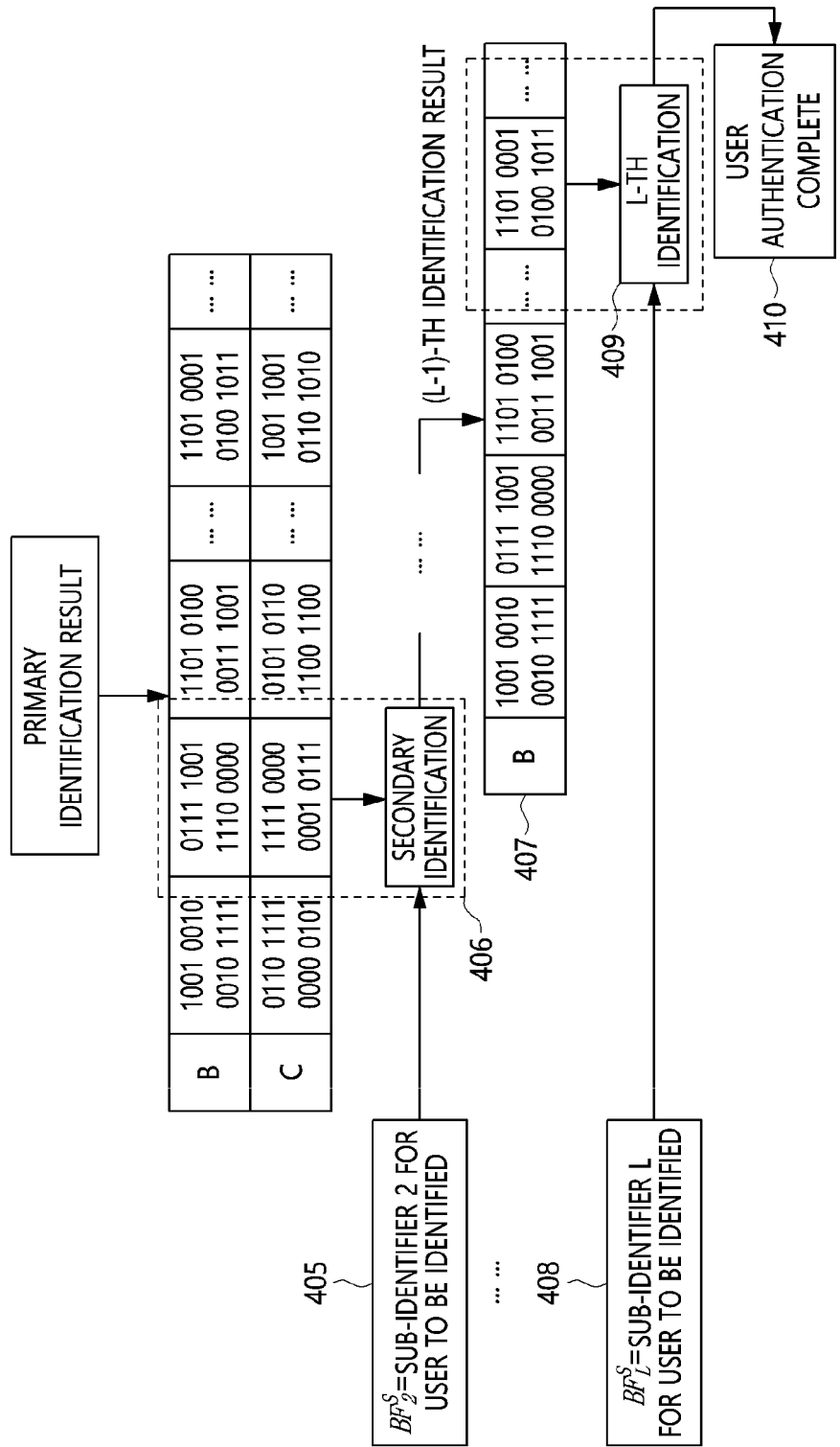
Figure 7:
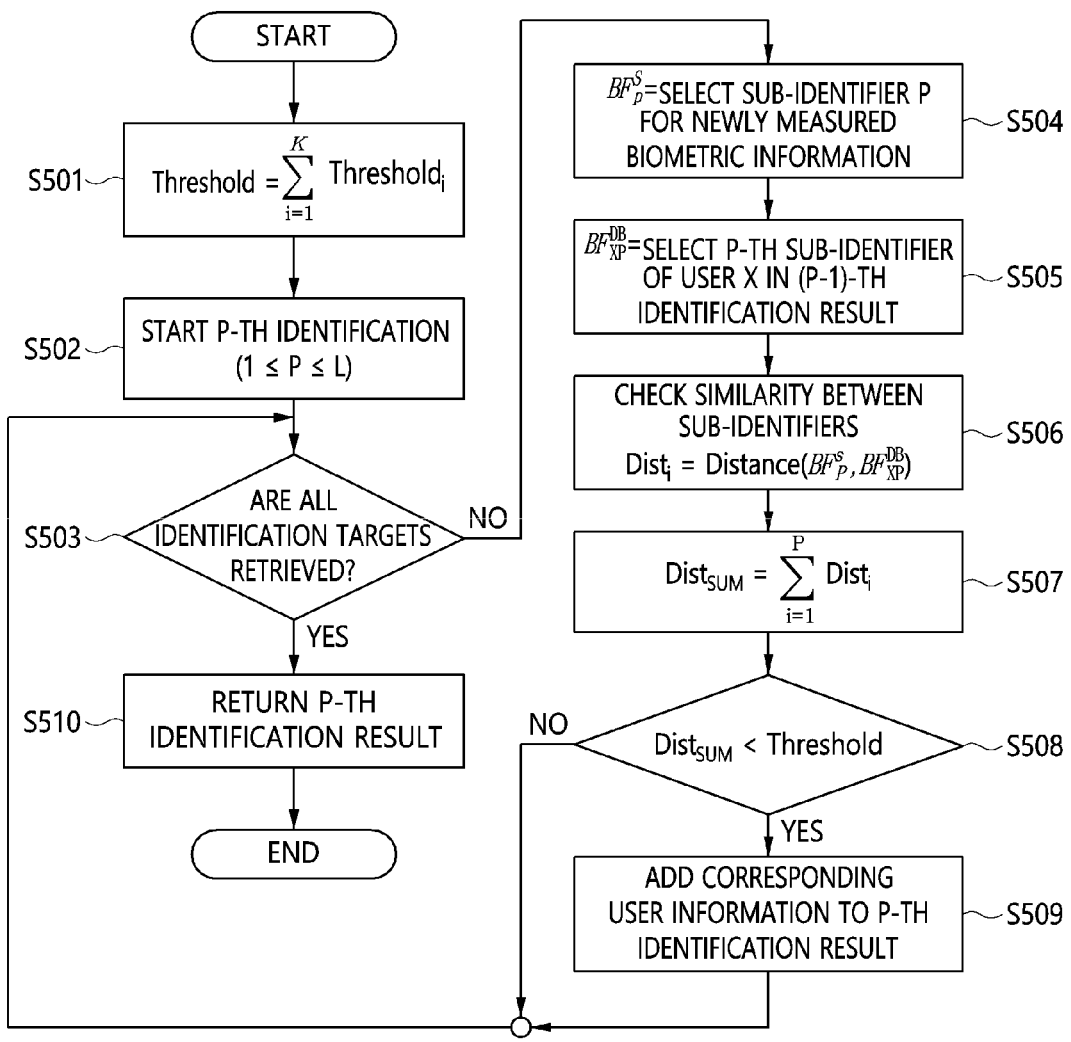
FIG. 7 is a flowchart specifically illustrating an example of the P-th identification process in the user authentication procedure illustrated in FIGS. 5 and 6.

FIG. 2 is a flowchart illustrating a method for user authentication based on multiple pieces of biometric information according to an embodiment of the present invention. FIG. 3 is a view illustrating the process of generating a personal identifier according to an embodiment of the present invention. FIG. 4 is a view illustrating a user information database table according to an embodiment of the present invention. FIGS. 5 and 6 are views illustrating a user authentication procedure according to an embodiment of the present invention. FIG. 7 is a flowchart specifically illustrating an example of the P-th identification process in the user authentication procedure illustrated in FIG. 5 and FIG. 6.

Referring to FIG. 2, in the method for user authentication based on multiple pieces of biometric information according to an embodiment of the present invention, first, a personal identifier may be generated at step S110.

That is, at step S110, multiple pieces of biometric information may be received from the client device 101 of a user, and the personal information of the user may be generated using a neural network and a Bloom filter algorithm.

Referring to FIG. 3, the process of generating a personal identifier based on a neural network is illustrated. Here, step S110 may be performed when a user requests the apparatus 103 for user authentication based on multiple pieces of biometric information to perform user registration or authentication.

As illustrated in FIG. 3, a total of K pieces of biometric information 201 for the user may be input in order to generate a personal identifier at step S110. Here, K may be the total number of pieces of biometric information that are input. For example, when K is 5 (K=5), this may indicate that a total of five pieces of biometric information are acquired by receiving one of every type of biometric information when five types of biometric information (a face, voice, an iris, a gait, and hand geometry) are provided or by receiving two pieces of face information, one piece of voice information, and two pieces of iris information when three types of biometric information (a face, voice, and an iris) are provided.

Here, at step S110, K quantized numbers $Q_1$ to $Q_K$ may be generated from the K pieces of biometric information using K uniform or heterogenous neural networks 202.

Here, each of the quantized numbers (an integer sequence or vector) may include L integers.

Here, at step S110, using L Bloom filter algorithms 203, L Bloom filter output values $BF_1$ to $BF_L$ may be generated from the K integer sequences $Q_1$ to $Q_K$, each of which includes L integers.

Here, $BF_i$, which is the i-th Bloom filter output value ($1 \leq i \leq L$), may be the result value acquired by using the i-th integers of the K respective integer sequences as the input values of the Bloom filter algorithm.

Finally, at step S110, a personal identifier 204 for a single user may be generated by concatenating the L Bloom filter output values (L sub-identifiers).

That is, the personal identifier may be configured as "$BF_1 \| BF_2 \| \ldots \| BF_L$".

When a personal identifier is configured as described above, even though the number of pieces of biometric information increases, the total length of the personal identifier does not increase because the value of the biometric information is assigned within the Bloom filter output value. Also, even if the personal identifier is exposed outside, because restoration of the biometric information of a corresponding user requires calculation of the reverse function of a one-way hash function for the Bloom filter algorithm, the biometric information is prevented from being exposed outside.

Referring to FIG. 4, it is understood that a user information database table according to an embodiment of the present invention is illustrated.

The user information database table 300 illustrated in FIG. 4 shows an example of personal identifiers for three users A, B and C. As mentioned in the description of step S110, a single personal identifier may include a total of L Bloom filter output values (sub-identifier 1 to sub-identifier L). In the user information database table 300 illustrated in FIG. 4, each of the Bloom filter output values (sub-identifier 1, sub-identifier 2, ..., sub-identifier L) is of 16 bits, and a single personal identifier may be configured with a total of 16×L bits.

Also, in the method for user authentication based on multiple pieces of biometric information according to an embodiment of the present invention, the user may be authenticated based on the multiple pieces of biometric information at step S120.

That is, at step S120, the user may be authenticated by checking the similarity between the personal identifier of the user and each of personal identifiers previously registered in the user information database 104.

Here, at step S120, the personal identifier generated from the multiple pieces of biometric information, which are newly input from the client device 101 of the user in order to authenticate the user, may be compared with each of the personal identifiers previously registered in the user information database 104 in order to check the similarity therebetween.

Here, at step S120, the most similar user is retrieved, and whether or not the corresponding user is an authorized user may be checked.

Referring to FIG. 5 and FIG. 6, it will be understood that authenticating the user at S120 is specifically illustrated.

At step S120, primary identification 403 may be performed by comparing the sub-identifier 1 (402) of the personal identifier ($BF^S = BF_1^S \| BF_2^S \| \ldots \ldots BF_L^S$), which is generated from the newly input biometric information, with the sub-identifier 1 of each of the personal identifiers previously registered in the user information database 104 in order to check the similarity therebetween.

Here, at step S120, user information for the personal identifiers, each of which satisfies the condition that the distance acquired as the result of checking the similarity between the sub-identifier 1 thereof and the sub-identifier 1 of the personal identifier generated from the newly input biometric information be equal to or less than a preset threshold, may be generated as a primary identification result 404.

Here, at step S120, secondary identification 406 may be performed by comparing the sub-identifier 2 (405) of the personal identifier generated from the newly input biometric information with the sub-identifier 2 of each of the personal identifiers included in the primary identification result so as to check the similarity therebetween.

Here, at step S120, user information for the personal identifiers satisfying the condition that the distance acquired as the result of checking the similarity between the sub-identifiers 2 is equal to or less than a preset threshold may be generated as a secondary identification result 407.

Subsequently, at step S120, tertiary identification is attempted for the secondary identification result, and in the same manner, identification may be repeatedly performed until L-th identification. That is, identification may be repeatedly performed as many times as the number of sub-identifiers included in the personal identifier.

Here, at step S120, the last identification, that is, the L-th identification 409, may be performed by comparing the sub-identifier L (408) of the personal identifier generated from the newly input biometric information with the sub-identifier L of each of the personal identifiers included in the (L−1)-th identification result 407 so as to check the similarity therebetween.

At step S120, after L-th identification is performed, when the sum of the distances of all of the sub-identifiers is equal to or less than a threshold, the user is determined to be an authorized user.

At step S120, if the sum of the distances exceeds the threshold in the L-th identification process or before the L-th identification process, it may be determined that the user is not an authorized user.

At step S120, the user authentication procedure may be finished (410) when the similarity check for all of the sub-identifiers is completed.

As described above, the method for user authentication based on multiple pieces of biometric information according to an embodiment of the present invention may enable multiple sub-identifiers to be generated using the characteristics of a neural network, and may gradually reduce the number of targets to be identified when identification is repeatedly performed based on multiple sub-identifiers.

That is, the method for user authentication based on multiple pieces of biometric information according to an embodiment of the present invention may reduce a computational load, and may reduce the time required to retrieve all user information from the user information database.

FIG. 7 is a flowchart specifically illustrating the process of checking the similarity between sub-identifiers at step S120 illustrated in FIG. 5 and FIG. 6.

That is, the flowchart in FIG. 7 shows an example of the P-th identification process (1≤P≤L), among a total of L identification processes illustrated in FIG. 5 and FIG. 6.

First, a total threshold, which is the sum of thresholds (Threshold$_1$, Threshold$_2$, . . . , Threshold$_K$) for all pieces of biometric information 201, may be calculated at step S501.

In the P-th identification process, P may be the position of the sub-identifier that is currently being identified, among a total of L sub-identifiers 301 (sub-identifier 1 to sub-identifier L).

When P, which is the order of the sub-identifier that is being currently identified, is recognized at step S502, whether all of the currently given identification targets have been retrieved may be checked at step S503.

Here, at step S503, when P is 1 (P=1), all of the currently given identification targets may be all pieces of user information in the user information database 104. Then, the sub-identifier P for the newly input biometric information may be selected at step S504, and the sub-identifier P for a user included in the previous identification result ((P−1)-th identification result) may be selected at step S505.

Here, at step S506, the sub-identifier P for the newly input biometric information may be compared with the sub-identifier P for the user included in the previous identification result (the (P−1)-th identification result) so as to check the similarity therebetween.

Here, at step S506, the similarity may be checked using any of existing various methods, such as a hamming distance, a cosine similarity algorithm, and the like.

Here, at step S507, the sum of distances acquired by checking the similarity may be calculated for each user.

Here, at step S508, the sum of the distances is compared with the total threshold. When the sum of the distances is equal to or less than the total threshold, the user is determined to be an appropriate user, and the information of the user may be added to the P-th identification result at step S509.

Here, at step S508, when the sum of the distances for the corresponding user is greater than the total threshold, the user is determined to be inappropriate, the user is not added to the next identification target list, and similarity checking may be prepared for the next identification target list at step S503.

At step S503, after similarity checking is performed for all identification targets added to the (P−1)-th identification result, when identification of all of the sub-identifiers is completed, the identification result may be returned as the P-th identification result at step S510.

Figure 8:
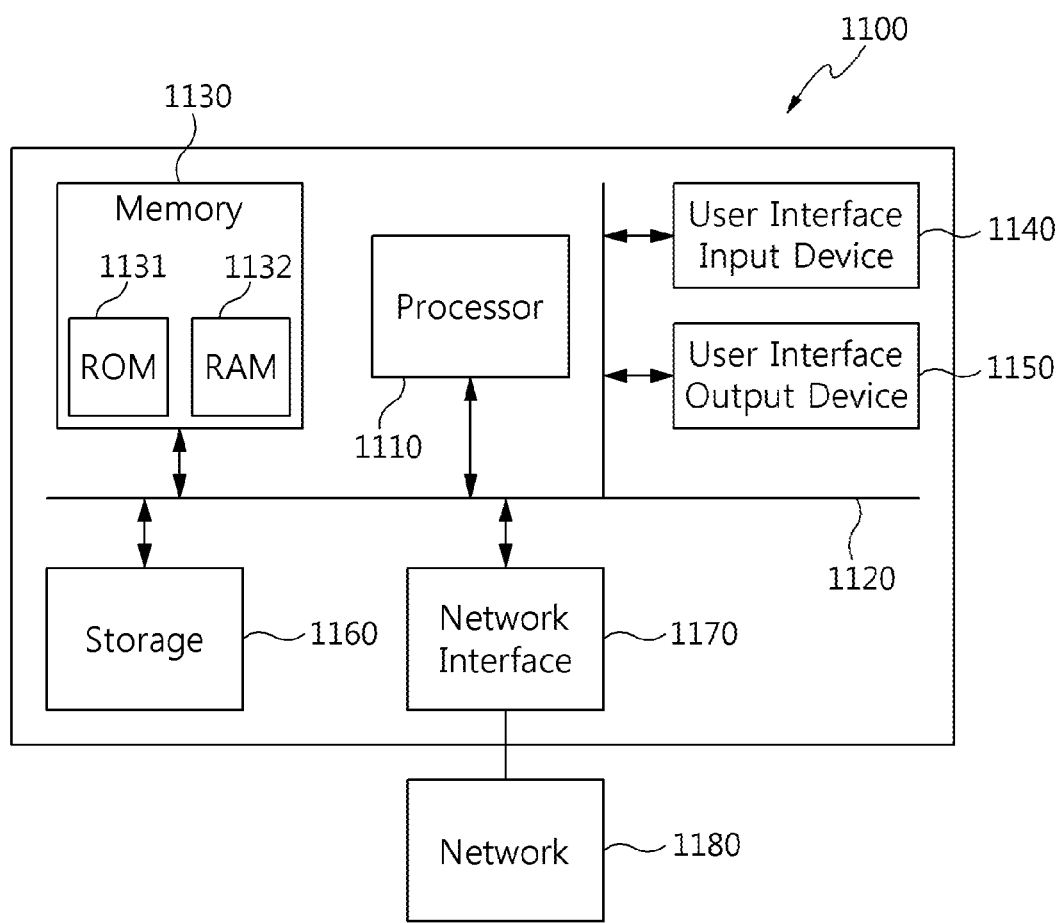
FIG. 8 is a view illustrating a computer system according to an embodiment of the present invention.

FIG. 8 is a view illustrating a computer system according to an embodiment of the present invention.

Referring to FIG. 8, the apparatus 103 for user authentication based on multiple pieces of biometric information according to an embodiment of the present invention may be implemented in a computer system 1100 including a computer-readable recording medium. As illustrated in FIG. 8, the computer system 1100 may include one or more processors 1110, memory 1130, a user-interface input device 1140, a user-interface output device 1150, and storage 1160, which communicate with each other via a bus 1120. Also, the computer system 1100 may further include a network interface 1170 connected to a network 1180. The processor 1110 may be a central processing unit or a semiconductor device for executing processing instructions stored in the memory 1130 or the storage 1160. The memory 1130 and the storage 1160 may be any of various types of volatile or nonvolatile storage media. For example, the memory may include ROM 1131 or RAM 1132.

The apparatus 103 for user authentication based on multiple pieces of biometric information according to an embodiment of the present invention may include one or more processors 1110 and executable memory 1130 for storing at least one program executed by the one or more processors 1110. The at least one program may receive multiple pieces of biometric information from the client device of a user, may generate the personal identifier of the user using a neural network and a Bloom filter algorithm, and may check the similarity between the personal identifier of the user and each of personal identifiers previously registered in a database through comparison, thereby authenticating the user.

Here, the at least one program may generate multiple quantized values from the multiple pieces of biometric information using the neural network.

Here, the at least one program may generate multiple Bloom filter output values from the multiple quantized values using the Bloom filter algorithm.

Here, the multiple Bloom filter output values may respectively correspond to multiple sub-identifiers, and the at least one program may generate the personal identifier of the user by concatenating the multiple sub-identifiers from the first sub-identifier to the last sub-identifier.

Here, the at least one program may compare each of the multiple sub-identifiers of the personal identifier of the user with a corresponding one of the multiple sub-identifiers of the personal identifier previously registered in the database so as to check the similarity therebetween, thereby authenticating the user.

Here, the at least one program may successively check similarity by comparing the first to last sub-identifiers of the personal identifier of the user with those of the previously registered personal identifier, thereby authenticating the user.

Here, the at least one program may check the similarity between second sub-identifiers following the first sub-identifiers only when the distance acquired by comparing the first sub-identifier of the personal identifier of the user with that of the previously registered personal identifier is equal to or less than a preset tolerance.

Here, the at least one program may determine that authentication of the user succeeds when each of the distances respectively acquired by comparing all of the sub-identifiers of the personal identifiers with corresponding ones of the sub-identifiers of the previously registered personal identifier is equal to or less than a preset first threshold and when the sum of the distances is equal to or less than a preset second threshold.

That is, the apparatus and method for user authentication based on multiple pieces of biometric information according to an embodiment of the present invention have advantages in that the size of required storage space is not changed despite increasing the number of types of biometric information and in that, even though the number of pieces of biometric information used for authenticating a user increases, the size of a personal identifier is not changed because the output value of the Bloom filter has a fixed size.

Also, the apparatus and method for user authentication based on multiple pieces of biometric information according to an embodiment of the present invention may quickly perform user authentication despite increasing the number of types of biometric information.

Also, in the case of the apparatus and method for user authentication based on multiple pieces of biometric information according to an embodiment of the present invention, despite increasing the number of types of biometric information, the computational load of checking similarity does not increase because a personal identifier has a fixed size. Furthermore, the number of targets to be identified gradually reduces as the identification procedure progresses from the primary identification of the sub-identifiers to the P-th identification thereof, whereby fast user authentication may be provided.

Also, in the case of the apparatus and method for user authentication based on multiple pieces of biometric information according to an embodiment of the present invention, because a personal identifier is the result of a one-way hash function, even if the personal identifier is exposed due to the leakage of a user database, biometric information, which is the source from which the personal identifier is generated, may be prevented from being restored.

The present invention may quickly enable rapid identification and authentication despite increasing the number of types of biometric information.

Also, the present invention may prevent an increase in the amount of storage space that is required even though the number of types of biometric information and the number of pieces of biometric information are increased.

Also, the present invention may prevent biometric information, which is private information, from being exposed even though an identifier is exposed due to the leakage of a user database.

As described above, the apparatus and method for user authentication based on multiple pieces of biometric information according to the present invention are not limitedly applied to the configurations and operations of the above-described embodiments, but all or some of the embodiments may be selectively combined and configured, so the embodiments may be modified in various ways.

What is claimed is:

1. An apparatus for user authentication based on multiple pieces of biometric information, comprising:
   one or more processors; and
   executable memory for storing at least one program executed by the one or more processors,
   wherein the at least one program is configured to:
   receive multiple pieces of biometric information from a client device of a user and generate a personal identifier of the user using a neural network and a Bloom filter algorithm, and
   authenticate the user by checking a similarity between the personal identifier of the user and each of personal identifiers previously registered in a database through comparison,
   wherein the at least one program generates multiple quantized values from the multiple pieces of biometric information using the neural network.

2. The apparatus of claim 1, wherein the at least one program generates multiple Bloom filter output values from the multiple quantized values using the Bloom filter algorithm.

3. The apparatus of claim 2, wherein:
   the multiple Bloom filter output values respectively correspond to multiple sub-identifiers, and
   the at least one program generates the personal identifier of the user by sequentially concatenating the multiple sub-identifiers from a first sub-identifier to a last sub-identifier.

4. The apparatus of claim 3, wherein the at least one program checks a similarity between each of the multiple sub-identifiers of the personal identifier of the user and a corresponding one of multiple sub-identifiers of the personal identifier previously registered in the database through comparison, thereby authenticating the user.

5. The apparatus of claim 4, wherein the at least one program successively checks similarities by comparing first to last sub-identifiers of the personal identifier of the user with those of the previously registered personal identifier, thereby authenticating the user.

6. The apparatus of claim 5, wherein the at least one program checks a similarity between second sub-identifiers following the first sub-identifiers only when a distance acquired by comparing the first sub-identifier of the personal identifier of the user with that of the previously registered personal identifier is equal to or less than a preset tolerance.

7. The apparatus of claim 5, wherein the at least one program determines that authentication of the user succeeds when each of distances respectively acquired by comparing all of the sub-identifiers of the personal identifier of the user with corresponding ones of the sub-identifiers of the previously registered personal identifier is equal to or less than a preset first threshold and when a sum of the distances is equal to or less than a preset second threshold.

8. A method for user authentication based on multiple pieces of biometric information, performed by an apparatus for user authentication based on multiple pieces of biometric information, the method comprising:
  receiving multiple pieces of biometric information from a client device of a user and generating a personal identifier of the user using a neural network and a Bloom filter algorithm; and
  authenticating the user by checking a similarity between the personal identifier of the user and each of personal identifiers previously registered in a database through comparison,
  wherein generating the personal identifier of the user is configured to generate multiple quantized values from the multiple pieces of biometric information using the neural network.

9. The method of claim 8, wherein generating the personal identifier of the user is configured to generate multiple Bloom filter output values from the multiple quantized values using the Bloom filter algorithm.

10. The method of claim 9, wherein:
  the multiple Bloom filter output values respectively correspond to multiple sub-identifiers, and
  generating the personal identifier of the user is configured to sequentially concatenate the multiple sub-identifiers from a first sub-identifier to a last sub-identifier, thereby generating the personal identifier of the user.

11. The method of claim 10, wherein authenticating the user is configured to check a similarity between each of the multiple sub-identifiers of the personal identifier of the user and a corresponding one of multiple sub-identifiers of the personal identifier previously registered in the database through comparison, thereby authenticating the user.

12. The method of claim 11, wherein authenticating the user is configured to successively check similarities by comparing first to last sub-identifiers of the personal identifier of the user with those of the previously registered personal identifier, thereby authenticating the user.

13. The method of claim 12, wherein authenticating the user is configured to check a similarity between second sub-identifiers following the first sub-identifiers only when a distance acquired by comparing the first sub-identifier of the personal identifier of the user with that of the previously registered personal identifier is equal to or less than a preset tolerance.

14. The method of claim 12, wherein authenticating the user is configured to determine that authentication of the user succeeds when each of distances respectively acquired by comparing all of the sub-identifiers of the personal identifier of the user with corresponding ones of the sub-identifiers of the previously registered personal identifier is equal to or less than a preset first threshold and when a sum of the distances is equal to or less than a preset second threshold.

* * * * *